United States Patent Office 3,383,327
Patented May 14, 1968

3,383,327
FOAM CONTROL AGENTS
Robert E. Sullivan, Bay City, Mich., assignor to Dow Corning Corporation, Midland, Mich., a corporation of Michigan
No Drawing. Filed May 6, 1963, Ser. No. 278,427
1 Claim. (Cl. 252—358)

This invention relates to improved foam control agents.

The use of various silicones as foam control agents is well known. It is also well known that the addition of silica to the silicones enhances their ability to control foam. However, heretofore it has been extremely difficult, if not impossible, to prepare silicone foam control agents which contain silica and are also stable, that is, formulations from which the silica does not settle out. This problem has been found to be particularly acute when such formulations are diluted with a solvent prior to use.

It is an object of this invention to provide foam control agents having improved stability and better handling properties than the foam control agents known heretofore. It is a further object of this invention to provide processes for preparing the foam control agents of this invention whereby foam control agents of improved stability, lower apparent viscosity and having improved handling properties are obtained.

It has now been discovered that a foam control agent containing 1 to 10 percent by weight of silica and having a viscosity from 50 to 500,000 cs. at 25° C. which consists essentially of (A) an intimate mixture of a polydimethylsiloxane gum and a silica having a surface area of at least 50 square meters per gram, said silica having organosilyl groups on the surface thereof, and (B) a polydimethylsiloxane fluid, is unexpectedly more stable than the silica containing silicone foam control agents known heretofore.

One method of preparing the foam control agent supra is by mixing a polydimethylsiloxane gum (having a viscosity above 1,000,000 cs.), silica having no organosilyl groups on the surface thereof and a hydroxylated polydimethylsiloxane fluid, heating the mixture while subjecting it to a shearing action and then dispersing the mixture in a polydimethylsiloxane fluid B. In this method the organosilyl groups are formed on the surface of the silica in situ.

It is difficult to set any meaningful numerical limitations on the temperature at which the mixture (A) should be heated and sheared since this will not only be dependent on the particular compounds involved, but will also be dependent on the degree of improvement which one is willing to accept. Thus, if so desired, one can obtain a foam control agent by the process of this invention which has improved stability (but which does not have the optimum obtainable stability) that will be satisfactory for a particular application.

Generally speaking, the mixture (A) must be heated at a temperature at least high enough to drive off any water from the silica, but at a temperature which is below the temperature at which any of the materials will decompose. Thus, it is generally preferable to heat the mixture at a temperature of at least 100° C.

The length of time which the mixture is sheared can vary anywhere from a few minutes to a number of hours and will depend to some extent on the temperature at which the mixture is being heated. The stability of the formulations prepared from the mixture improves the longer the mixture is sheared, there being a point of optimum or maximum stability being reached when additional heating and shearing of the mixture provides no useful benefits.

The above foam control agents can also be prepared by starting with a treated silica having organosilyl groups on the surface, mixing this silica with the gum with a shearing action and thereafter dispersing the gum-silica mixture in fluid (B). For best results the mixing should continue until the treated silica is thoroughly and uniformly dispersed in the gum. Heating is not required in this method.

Silicas having organosilyl groups on the surface thereof are well known and can be prepared in many ways such as by contacting the surface of a fume silica or silica aerogel with reactive silanes such as chlorosilanes or alkoxysilanes or with silanols or siloxanols or by reacting as silica hydrogel or organogel with silanes or siloxanes. Specific examples of such silicas are set forth in U.S. Patents 3,015,645 and 3,024,126.

The relative proportions of (A) and (B) in the foam control agent supra can vary over a wide range yet are limited by the amount of silica that can be present and the specified viscosity of the final product. The relative amounts of gum and silica in (A) are not critical, so far as applicant knows, except with respect to the obvious practical limitations. The same is true with respect to the viscosity of the fluid (B) so long as the final product has a viscosity within the specified range.

With respect to the gum, the term "polydimethylsiloxane gum" as employed herein is intended to include gums containing small amounts (i.e. less than 10 mol percent) of groups other than dimethyl groups and which contain some endblocking groups other than methyl groups (i.e. hydroxy, alkoxy, aryloxy, etc.) as well as gums containing only methyl groups.

The amount of organosilyl groups on the surface of the silica, whether pretreated or formed in situ varies with the conditions of treatment, but in all cases the silica is hydrophobic.

This invention also relates to a foam control agent having a viscosity of 50 to 500,000 cs. at 25° C. which consists essentially of from 1 to 10 parts based on the weight of (2) of (1) a silica having a surface area of at least 50 square meters per gram, and (2) an essentially polydiorganosiloxane fluid wherein the organo groups are selected from the group consisting of methyl, ethyl, and 2-phenylpropyl groups, said agent having been prepared by heating a mixture of (1) and (2) at a temperature of at least 100° C. while subjecting the mixture to a shearing action whereby a foam control agent having improved stability is obtained.

By way of illustration, the fluid (2) can be a polydimethylsiloxane, a polydiethylsiloxane, a polydi-2-phenylpropylsiloxane, a methylethylsiloxane, a methyl-2-phenylpropylsiloxane, an ethyl-2-phenylpropylsiloxane fluid, a mixture of any of the foregoing fluids or a fluid copolymer containing any combination of the foregoing groups. An example of a particularly preferred fluid is one having a methyl to silicon ratio of about 1:1, an ethyl to silicon ratio in the range of .7 to .9:1 and a 2-phenylpropyl to silicon ratio in the range of .1 to .3:1. It is understood by those skilled in the art, of course, that the term "polydiorganosiloxane" includes materials having small amounts of other groups present such as hydroxy, alkoxy, acyloxy and aryloxy groups as well as triorganosilyl groups such as trimethylsilyl groups, phenyldimethylsilyl groups and triethylsilyl groups, together with minor amounts of monoorganosiloxane groups.

The foregoing foam control agent is prepared by heating a mixture of a silica which does not have organosilyl groups on the surface and the fluid (2), while subjecting the mixture to a shearing action.

Generally speaking, the mixture must be heated at a temperature at least high enough to drive off any water from the silica, but at a temperature which is below the decomposition temperature of the materials. Thus, it is generally preferable to heat the mixture at a temperature of at least 100° C.

The length of time the mixture is sheared can vary anywhere from a few minutes to a number of hours and will depend to some extent on the temperature at which the mixture is being heated. The stability of the mixture improves the longer the mixture is sheared, there being a point of optimum or maximum stability being reached when additional heating and shearing of the mixtures provides no useful benefits.

It is believed that the heating and shearing places organosilyl groups on the surface of the silica.

With respect to both of the foregoing foam control agents, the silica employed must have a surface area of at least 50 square meters per gram, as measured by nitrogen adsorption in the method described in ASTM Special Technical Bulletin No. 51, page 95 et seq. (1941).

While the amount of the silica employed can vary in both of the foregoing foam control agents, it is generally preferred that the agent contain 1 to 10 percent by weight of the silica. A still more preferred range is 2 to 5 percent by weight.

In addition, both of the foregoing foam control agents can be modified, if so desired, by adding thereto any of the conventional organic foam control agents such as tributylphosphate that are compatible therewith.

In order that those skilled in the art can better understand how the present invention can be practiced, the following examples are given by way of illustration and not by way of limitation.

All parts and percents referred to herein are by weight and all viscosities measured at 25° C. unless otherwise specified.

Example 1

100 parts of a vinylmethyl-endblocked polydimethylsiloxane gum, 75 parts of a silica having a surface area of about 225 square meters per gram and 22 parts of a hydroxylated polydimethylsiloxane fluid were mixed and sheared for about 3 hours while at a temperature of about 175° C. This mixture was then used to prepare the foam control agents below and is referred to as the "base" therein.

(A) 15.74 g. of the above base dispersed in 184.26 g. of a polydimethylsiloxane fluid having a viscosity of 100 cs.

(B) 15.8 g. of the above base dispersed in a mixture of 110.8 g. of a trimethylsilyl-endblocked polydimethylsiloxane fluid having a viscosity of 100 cs. and 73.4 g. of a hydroxy-methoxy-endblocked polydimethylsiloxane fluid having a viscosity of 1000 cs.

(C) 63 g. of the above base dispersed in 737 g. of a hydroxylated polydimethylsiloxane fluid having a viscosity of 922 cs.

(D) 15.8 g. of the above base dispersed in a mixture of 110.8 g. of a polydimethylsiloxane fluid having a viscosity of 100 cs. and 73.4 g. of a hydroxylated polydimethylsiloxane fluid having a viscosity of about 800 cs.

(E) 80 parts of foam control agent A above mixed with 20 parts of tributyl phosphate.

Example 2

The five foam control agents of Example 1 were tested for antifoaming ability as follows: 100 cc. of a .1 percent solution of Tween 80 (a polyoxyalkylene derivative of sorbitan monooleate) was placed in an 8 ounce round bottle. One drop of the foam control agent was placed in the center of the solution. Then a cap was placed on the bottle, the bottle shaken ten times and the time for the foam to break so the surface could be seen determined. The results are set forth below.

| Foam control agent: | Antifoam break time (seconds) |
|---|---|
| A | 5 |
| B | 5 |
| C | 4 |
| D | 6 |
| E | 4 |

Example 3

The stability of foam control agent A of Example 1 was compared to the stability of a commercially available foam control agent similar to A by diluting the formulations 1:5 in xylene (1 part compound in 5 parts xylene). In the commercial formulation there was a substantially complete separation of the silica whereas in foam control agent A an excellent dispersion was maintained, there being no observable settling of the silica. Also, foam control agent A had a Brookfield viscosity of about 1900 cs. as compared with a viscosity of about 4100 cs. for the commercial formulation.

When foam control agents B–E of Example 1 are diluted 1:5 in xylene, no substantial settling of the silica occurs.

Example 4

100 parts of a vinylmethyl endblocked polydimethylsiloxane gum, 25 parts of a silica having a surface area of about 225 square meters per gram and 9.7 parts of a hydroxylated polydimethylsiloxane fluid were mixed and sheared for about three hours while at a temperature of about 190° C.

A foam control agent having excellent stability was prepared by dispersing 30 g. of the above mixture in 170 g. of a polydimethylsiloxane fluid having a viscosity of 100 cs.

Example 5

A foam control agent having improved stability was prepared by shearing a mixture of 40 g. of a silica having a surface area of about 225 square meters per gram and 960 g. of a trimethylsilyl endblocked polydimethylsiloxane fluid having a viscosity of 350 cs. for three hours at 175° C.

Example 6

A foam control agent having improved stability was prepared by shearing a mixture of 8 g. of a silica having a surface area of about 350 square meters per gram, 190 g. of a polydimethylsiloxane fluid having a viscosity of 350 cs. and 2 g. of a hydroxylated polydimethylsiloxane fluid having a viscosity of about 384 cs. for three hours at 175° C.

Example 7

A foam control agent having improved stability was prepared by shearing a mixture consisting of 3 percent of a silica having a surface area of about 225 square meters per gram and 97 percent of fluid having a methyl to silicon ratio of about 1:1, an ethyl to silicon ratio of about .8:1 and 2-phenylpropyl to silicon ratio of about .2:1 for three hours at 175° C.

Example 8

A good foam control agent was prepared containing 20 percent of tributylphosphate and 80 percent of the composition of Example 7.

Example 9

A foam control agent having improved stability was prepared by shearing a mixture of 190 g. of a polydimethylsiloxane fluid having a viscosity of 350 cs., 8 g. of a silica having a surface area of about 225 square meters per gram and 2 g. of a hydroxylated polydimethylsiloxane fluid having a viscosity of about 384 cs. for three hours at 175° C.

Example 10

This example shows the effect that the length of time a mixture is sheared at a particular temperature has on the stability of the product.

To a mixture of 102 pounds 4 ounces of a fluid having a methyl to silicon ratio of about 1:1, an ethyl to silicon ratio of about .8:1 and a 2-phenylpropyl to silicon ratio of about .2:1 and 485 g. of hydroxylated polydimethylsiloxane fluid, 3 pounds 3¼ ounces of a silica having a surface area of about 225 square meters per gram was added. Samples of the mixture were taken before shearing and after the mixture had been sheared for various lengths of time. These samples were allowed to stand for 3 days and then diluted 1:15 in xylene (1 g. in 15 g. of xylene) to determine their stability. The results are set forth below.

Time sheared at 175° C.:    Silica setting upon dilution
  No shearing _____ 73.0%.
  30 minutes _____ 19.2%.
  1 hour _____ 14.0%.
  2 hours _____ A few specks.
  3 hours _____ A few specks.

Example 11

96 pounds of a fluid having a methyl to silicon ratio of about 1:1, an ethyl to silicon ratio of about .8:1 and a 2-phenylpropyl to silicon ratio of about .2:1, one pound of a hydroxylated polydimethylsiloxane fluid and three pounds of a silica having a surface area of about 225 square meters per gram were mixed in a Phaudler. A wide open Colloid mill was used for shearing the mixture. The mass was heated to about 160° C. and continually recycled and sheared for about three hours. Samples of the mixture were taken before shearing and after the mixture had been sheared for various lengths of time. The samples were allowed to stand for 70 days and then diluted 1:15 in xylene to determine their stability. The apparent viscosity (Brookfield) of the concentrates before dilution was also measured. The results are set forth below.

| Time sheared at 160° C. | Silica Settling Upon Dilution | Viscosity (centipoises) |
|---|---|---|
| No shearing | 92% | >20,000 |
| 30 minutes | 28% | 4,050 |
| 1 hour | 20% | 3,900 |
| 2 hours | A few parts | 3,900 |
| 3 hours | do | 4,000 |

Example 12

A mixture of 97 parts of a polydimethylsiloxane fluid having a viscosity of 500 cs. and 3 parts of silica having trimethylsilyl groups on its surface was subjected to a shearing action. After 24 hours this concentrate showed excellent stability.

Example 13

When a mixture consisting of 98 parts of a hydroxy endblocked polydimethylsiloxane gum, 1 part of a hydroxylated polydimethylsiloxane fluid having a viscosity of about 40 cs. and 1 part of a silica having a surface area of about 100 square meters per gram is heated to about 125° C. and subjected to a strong shearing action for about 5 hours, a foam control agent having improved stability is obtained.

Example 14

When a mixture consisting of 93 parts of a polydimethylsiloxane gum, 5 parts of a silica having a surface area of about 300 square meters per gram and 1 part of a hydroxylated polydimethylsiloxane fluid is heated to about 145° C. and subjected to shearing for about 4 hours, a foam control agent of improved stability is obtained.

Example 15

When 100 parts of a polydimethylsiloxane gum, 75 parts of a silica having a surface area of about 225 square meters per gram and 22 parts of a hydroxylated polydimethylsiloxane fluid are mixed and sheared at a temperature of about 175° C. for 3 hours and then 7.87 parts of this mixture dispersed in 92.13 parts of a polydimethylsiloxane fluid having a viscosity of 100 cs., a foam control agent having improved stability is obtained.

That which is claimed is:

1. A foam control agent having a viscosity from 50 to 500,000 cs. at 25° C. prepared by heating a mixture of
   (1) 96 percent by weight of an essentially polydiorganosiloxane wherein the organo groups are selected from the group consisting of the methyl, ethyl and 2-phenylpropyl groups, said fluid having a methyl to silicon ratio of about 1:1, an ethyl to silicon ratio in the range of .7 to .9:1 and a 2-phenylpropyl to silicon ratio in the range of .1 to .3:1,
   (2) about 3 percent by weight of silica having a surface area of about 225 square meters per gram, and
   (3) about 1 percent by weight of a hydroxylated polydimethylsiloxane fluid, at a temperature of at least 100° C. while the mixture is being subjected to a shearing action whereby a foam control agent having improved stability is obtained.

References Cited

UNITED STATES PATENTS

| 3,088,964 | 5/1963 | Ryan | 260—448.2 |
| 2,632,736 | 3/1953 | Currie | 252—358 |
| 2,894,913 | 7/1959 | Sullivan et al. | 252—358 |
| 3,015,645 | 1/1962 | Tyler | 260—46.5 |
| 3,070,560 | 12/1962 | Metevia | 260—46.5 |
| 3,113,930 | 12/1963 | Chevalier | 252—358 |
| 3,128,196 | 4/1964 | Keith | 106—308 |
| 2,870,109 | 1/1959 | Nickerson | 106—308 |
| 3,024,126 | 3/1962 | Brown | 106—308 |

FOREIGN PATENTS 544,234  7/1957  Canada.

LEON D. ROSDOL, *Primary Examiner.*

JULIUS GREENWALD, *Examiner.*

H. B. GUYNN, *Assistant Examiner.*